(12) United States Patent
Kim et al.

(10) Patent No.: US 11,953,933 B2
(45) Date of Patent: Apr. 9, 2024

(54) PEDAL SIMULATOR

(71) Applicant: HYUNDAI MOBIS CO., LTD., Seoul (KR)

(72) Inventors: Jin Hyun Kim, Yongin-si (KR); Myeon Gyu Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/973,589

(22) Filed: Oct. 26, 2022

(65) Prior Publication Data

US 2023/0409070 A1    Dec. 21, 2023

(30) Foreign Application Priority Data

Jun. 10, 2022  (KR) .................. 10-2022-0070664

(51) Int. Cl.
*B60T 7/06* (2006.01)
*G05G 5/03* (2008.04)

(52) U.S. Cl.
CPC .................. *G05G 5/03* (2013.01); *B60T 7/06* (2013.01); *G05G 2505/00* (2013.01)

(58) Field of Classification Search
CPC ..................................... B60T 7/06; G05G 5/03
See application file for complete search history.

(56) References Cited

U.S. PATENT DOCUMENTS 6,367,886 B1    4/2002  Shaw

FOREIGN PATENT DOCUMENTS

| CN | 107107883 A | | 8/2017 | |
|---|---|---|---|---|
| CN | 110667543 A | * | 1/2020 | ............. B60T 13/74 |
| DE | 102007030312 A1 | | 1/2009 | |
| DE | 102008063771 A1 | | 6/2010 | |
| JP | 2015-093557 A | | 5/2015 | |
| KR | 10-2011-0021357 A | | 3/2011 | |
| KR | 2011021357 A | * | 3/2011 | |
| KR | 10-2019-0136653 A | | 12/2019 | |
| KR | 10-2223847 B1 | | 3/2021 | |

OTHER PUBLICATIONS

Machine Translation of CN-110667543 found merged with Foreign Reference.*
Extended European Search Report dated May 26, 2023 in the corresponding European Patent Application No. 22205833.1.

* cited by examiner

*Primary Examiner* — Kenneth Bomberg
*Assistant Examiner* — Daniel S Collins
(74) *Attorney, Agent, or Firm* — NovoTechIP International PLLC

(57) ABSTRACT

Disclosed are a pedal simulator including a housing, a piston part slidably mounted in an inner space of the housing, and including a plurality of piston rod units, and a plurality of damper parts mounted in the housing, and disposed to face the plurality of piston rod units, respectively, wherein the damper parts are compressed by pressure from the piston rod units facing each other.

7 Claims, 11 Drawing Sheets

PEDAL SIMULATOR

CROSS-REFERENCE TO RELATED APPLICATIONS

This application claims the benefit of priority under 35 USC § 119(a) to Korean Patent Applications No. 10-2022-0070664, filed on Jun. 10, 2022, the entire disclosure of which is incorporated herein by reference for all purposes.

TECHNICAL FIELD

Exemplary embodiments of the present disclosure relate to a pedal simulator, and more particularly, to a pedal simulator applicable to all types of pedals regardless of type and shape of the pedal.

BACKGROUND

A pedal simulator is a part mounted on an electro-mechanical brake (EMB), and provides a driver with the braking feeling generated from an existing mechanical brake.

In the prior art, a hydraulic system is applied to the EMB. However, as technologies related to an electro-mechanical brake system, i.e., a Brake-By-Wire System, and an autonomous vehicle have recently emerged, the development of a non-hydraulic brake system is required.

A pedal may be divided into an organ-type pedal and a pendant-type pedal. In the prior art, a pedal simulator had to be newly developed according to types and layouts of a pedal. Since a separate pedal simulator is required depending on the types of a pedal, production cost increases, and repair is difficult. Therefore, there is a need to solve the problems.

The background technology of the present disclosure is disclosed in Korean Patent No. 10-2223847 (Feb. 26, 2021) entitled "PEDAL SIMULATOR."

SUMMARY

Various embodiments are directed to a pedal simulator capable of improving valid and invalid strokes and a braking feeling.

In an embodiment, a pedal simulator includes: a housing; a piston part slidably mounted in an inner space of the housing, and including a plurality of piston rod units; and a plurality of damper parts mounted in the housing, and disposed to face the plurality of piston rod units, respectively, wherein the damper parts are compressed by pressure of the piston rod units facing each other.

The plurality of damper parts is compressed by the plurality of piston rod units with a time difference.

The piston part further includes: a piston body unit; and a piston pressing unit mounted on one side of the piston body unit, wherein the plurality of piston rod units include: a first piston rod unit mounted on the other side of the piston body unit, and configured to press any one of the plurality of damper parts; and a second piston rod unit mounted on the other side of the piston body unit so as to be spaced apart from the first piston rod unit, and configured to press the other one of the plurality of damper parts.

The first and second piston rod units are formed to have different lengths.

The plurality of damper parts includes: a first damper part disposed to face the first piston rod unit, mounted in the housing, and compressed by the first piston rod unit; and a second damper part disposed to face the second piston rod unit, mounted in the housing so as to be spaced apart from the first damper part, and compressed by the second piston rod unit.

The first damper part includes: a first damper body unit mounted in the housing; a first damper contact unit disposed to be spaced apart from the first damper body unit, and configured to contact the first piston rod unit; a connection unit having one side movably mounted in the first damper body unit and the other side mounted on the first damper contact unit; a sensor unit mounted on the first damper body unit, and configured to measure information on a position of the first piston rod unit; and a spring unit having one side in contact with the first damper body unit and the other side in contact with the first damper contact unit, and configured to provide an elastic force to the first damper contact unit moved by the first piston rod unit.

The connection unit includes: a connection block unit movably mounted in the first damper body unit; and a connection rod unit having one side mounted on the connection block unit and the other side mounted on the first damper contact unit.

The second damper part is formed of an elastically deformable material, and is coupled to the housing.

The piston pressing unit is rotatably coupled to the piston body unit.

In an embodiment, a pedal simulator includes: a housing detachably mounted on pedal parts; a piston part slidably mounted in an inner space of the housing, and including a plurality of piston rod units; and a plurality of damper parts mounted in the housing, and disposed to face the plurality of piston rod units, respectively, wherein the damper parts are compressed by pressure of the piston rod units facing each other.

The housing includes: a housing body part in which the damper parts are mounted, and configured to movably accommodate the piston part; and a hook part formed on an outer side of the housing body part, and detachably coupled to the pedal parts.

The hook part is provided as a plurality of hook parts that are formed on an edge of the housing body part.

The pedal simulator according to the present disclosure enables common use of products through modularization applicable to all pedal parts regardless of types and shapes of a pedal part.

Since various types of pedal parts due to modularization according to the present disclosure come into common use, repair and replacement of products can be reduced, and productivity can be improved.

In addition, according to the present disclosure, as a first piston rod unit and a second piston rod unit are formed to have different lengths, the first and second piston rod units are tunable so that a user can have appropriate initial and medium period braking feelings and an appropriate later period braking feeling.

Moreover, according to the present disclosure, it is possible to reduce the volume of a housing through parallel structures of first and second piston rod units and first and second damper parts.

Effects of the present disclosure are not limited to the aforementioned effects, and may include various effects within a range evident to those skilled in the art from the following description.

DETAILED DESCRIPTION

Figure 1:
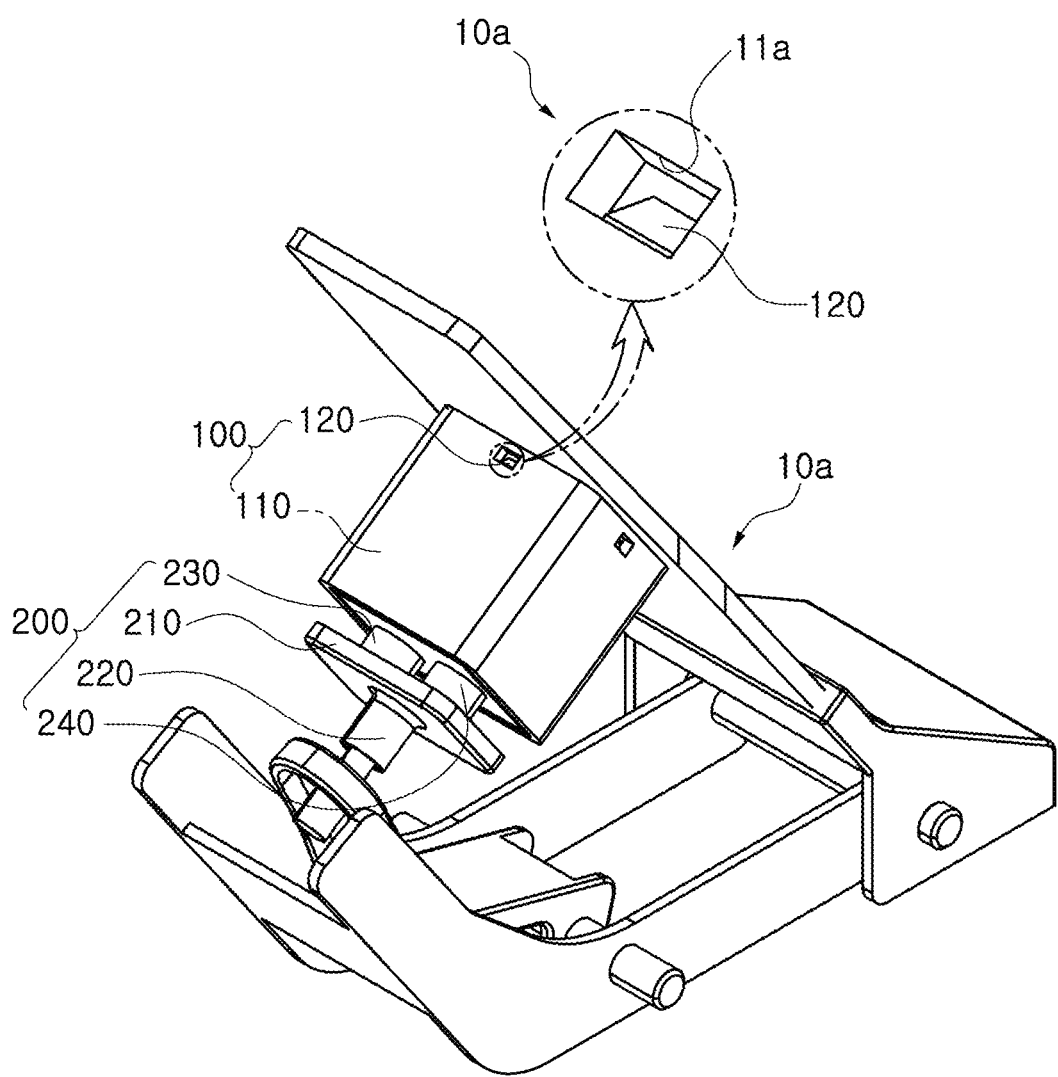
FIG. 1 is a perspective view schematically illustrating that a pedal simulator according to the present disclosure is mounted on an organ-type pedal part.

Hereinafter, a pedal simulator will be described in detail with reference to the accompanying drawings through various exemplary embodiments. In such a process, the thicknesses of lines or the sizes of elements illustrated in the drawings may have been exaggerated for the clarity of a description and for convenience' sake.

Terms to be described below have been defined by taking into consideration their functions in the present disclosure, and may be changed depending on a user or operator's intention or practice. Accordingly, such terms should be defined based on the overall contents of this specification.

Figure 2:
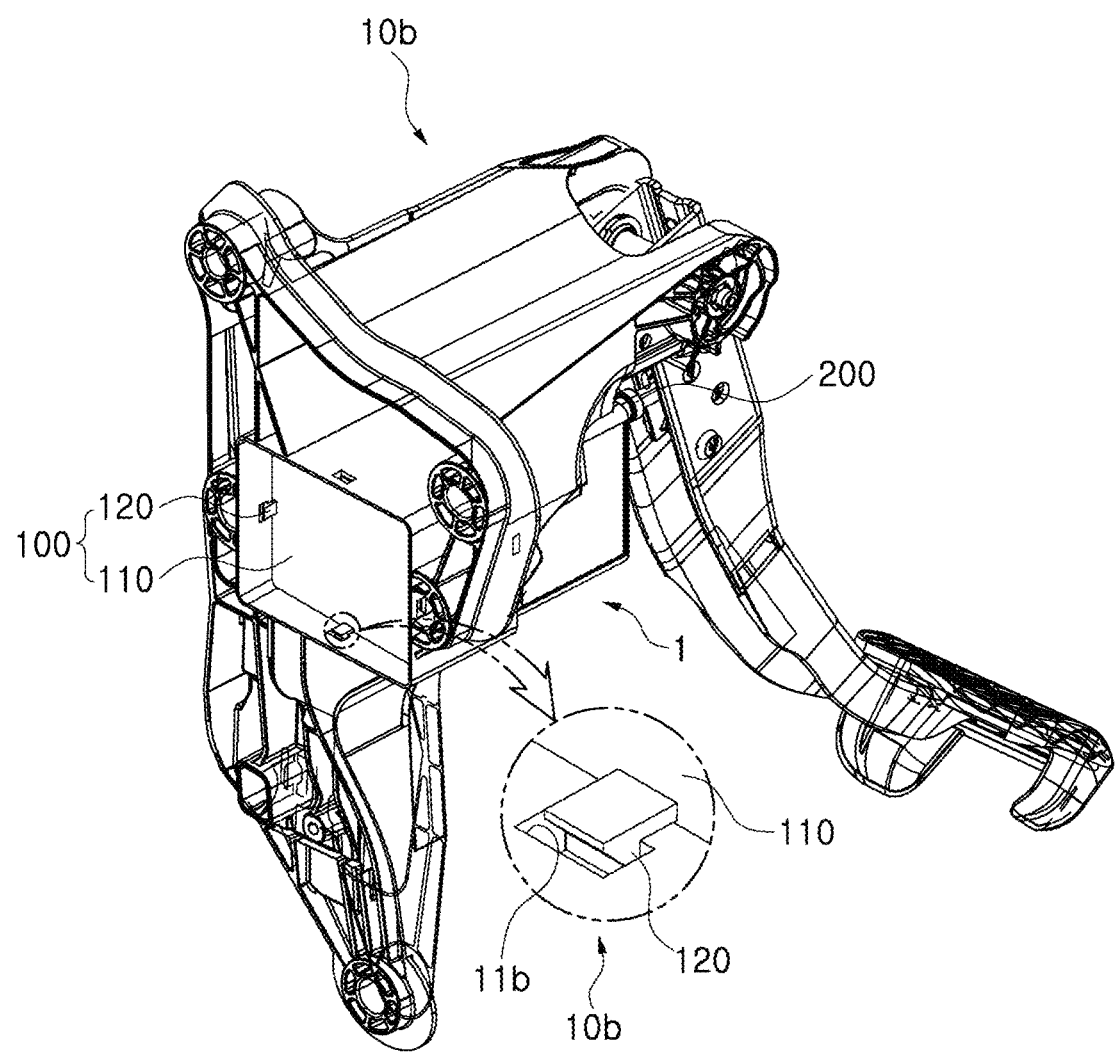
FIG. 2 is a perspective view schematically illustrating that the pedal simulator according to the present disclosure is mounted on a pendant-type pedal part.
Figure 3:
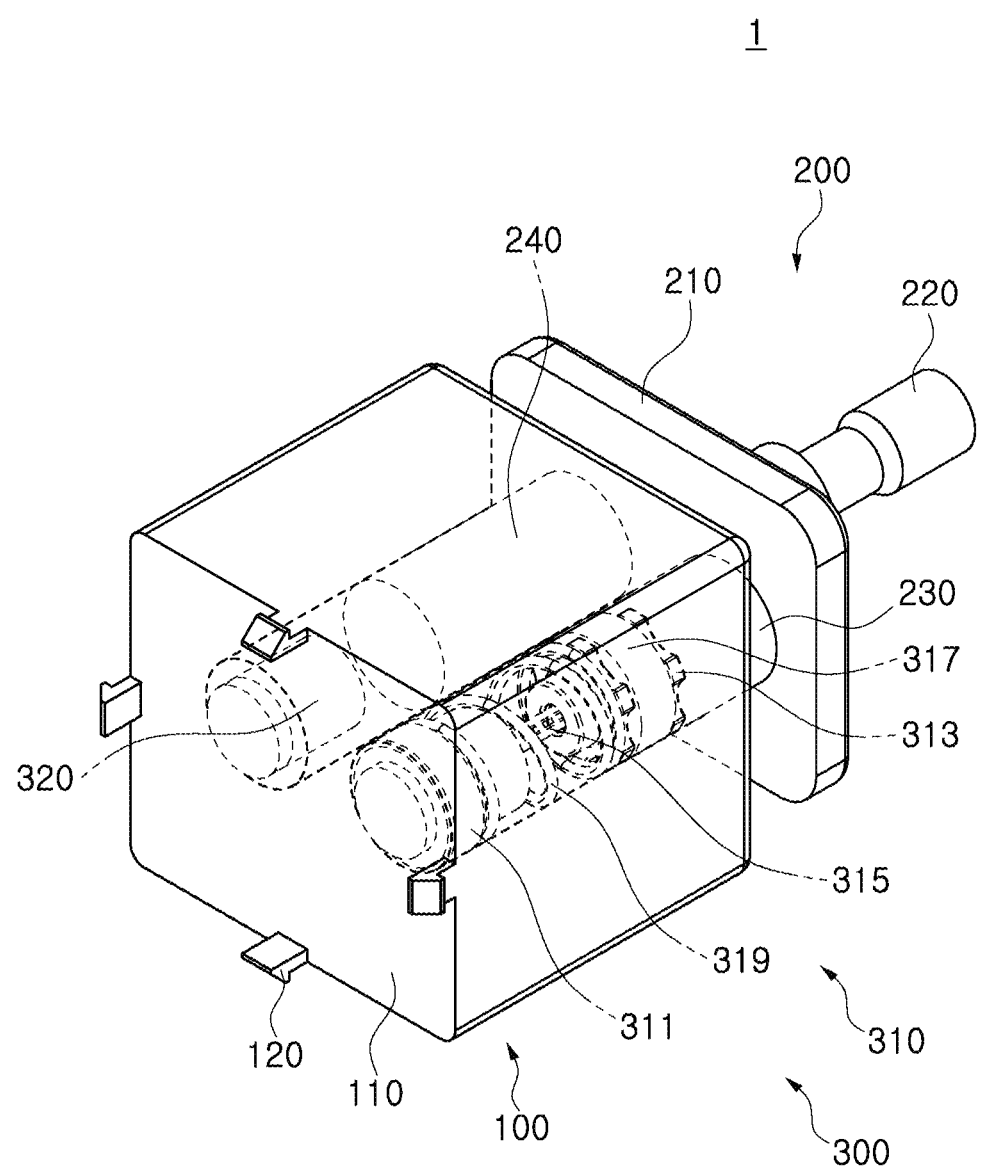
FIG. 3 is a perspective view schematically illustrating the pedal simulator according to the present disclosure.
Figure 4:
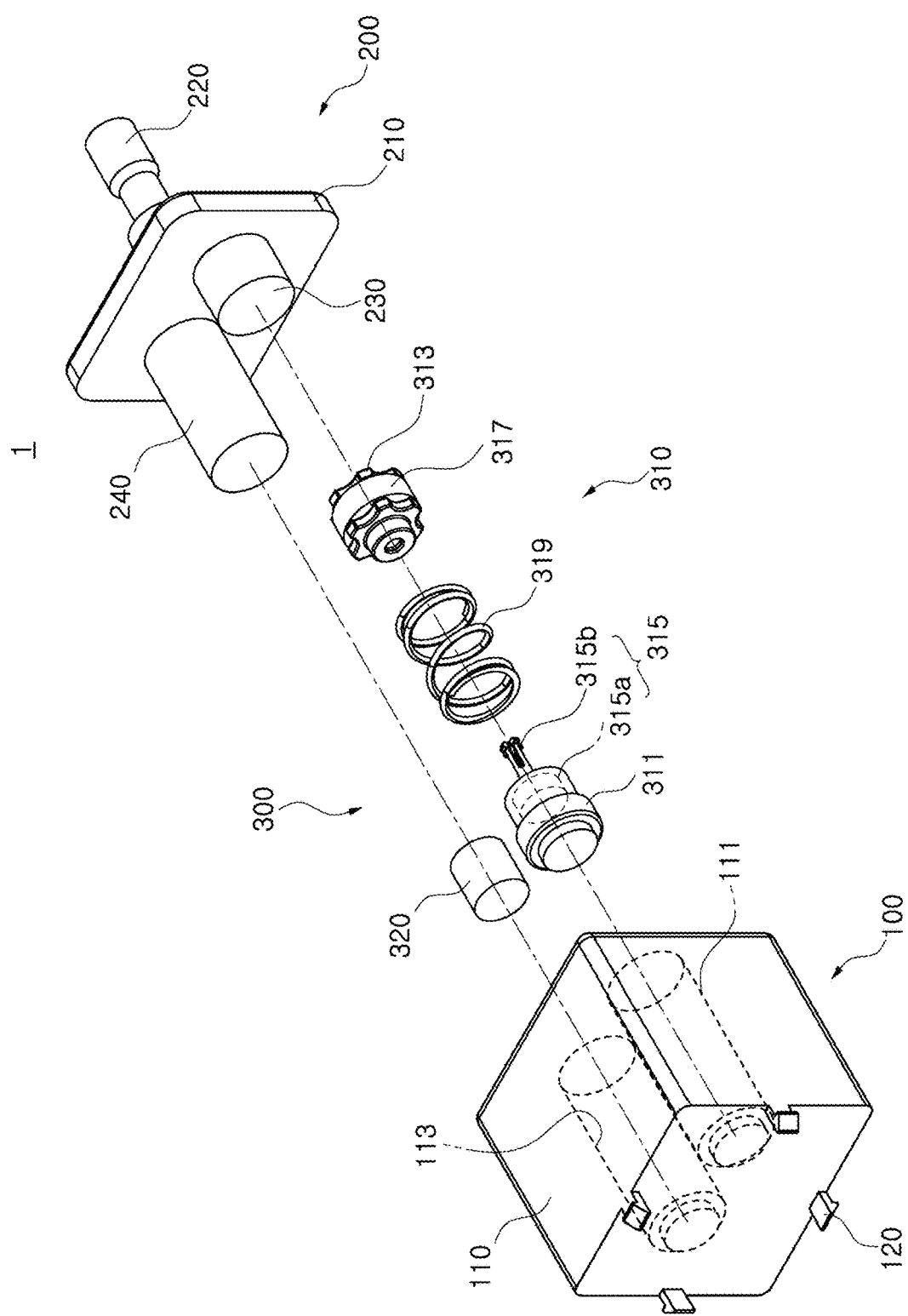
FIG. 4 is an assembled perspective view schematically illustrating the pedal simulator according to the present disclosure.
Figure 5:
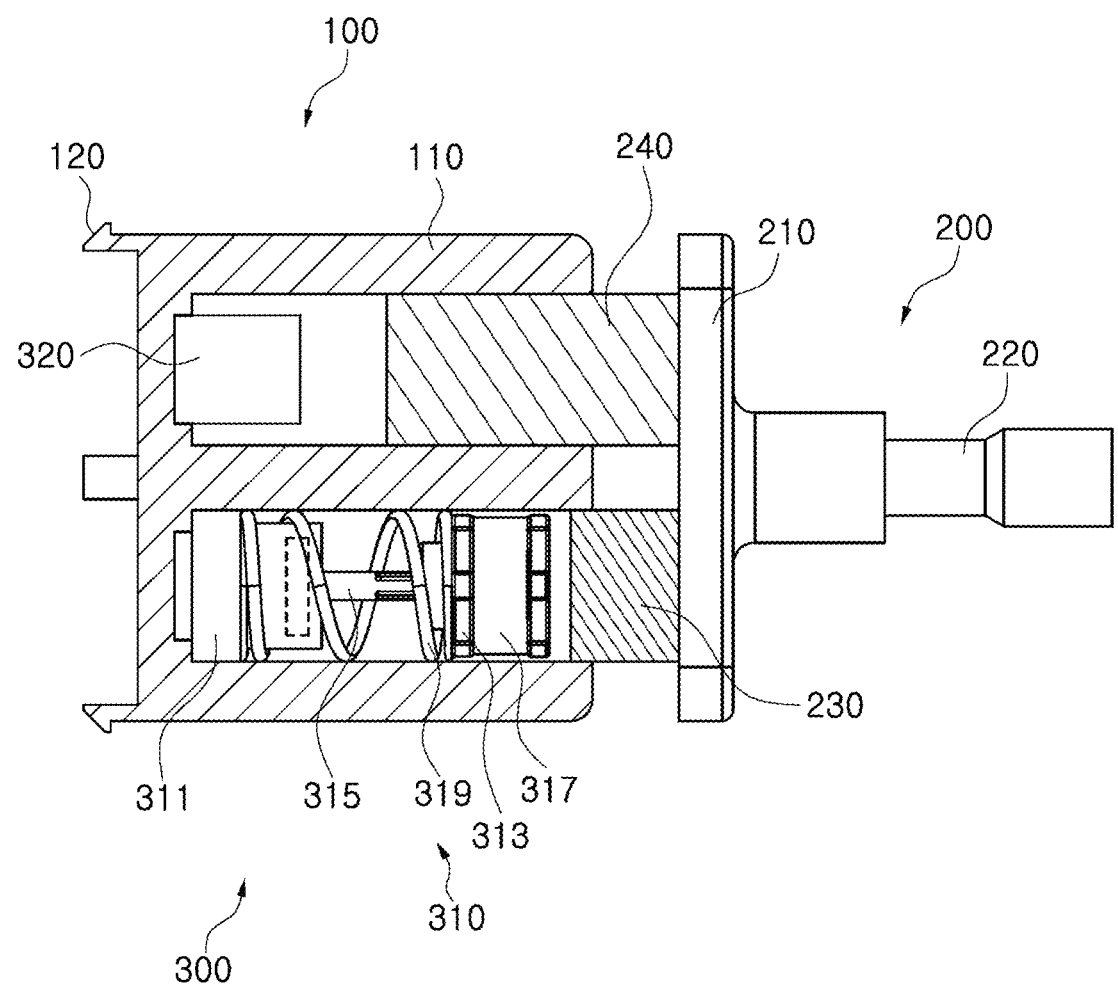
FIG. 5 is a cross-sectional view schematically illustrating the pedal simulator according to the present disclosure.
Figure 6:
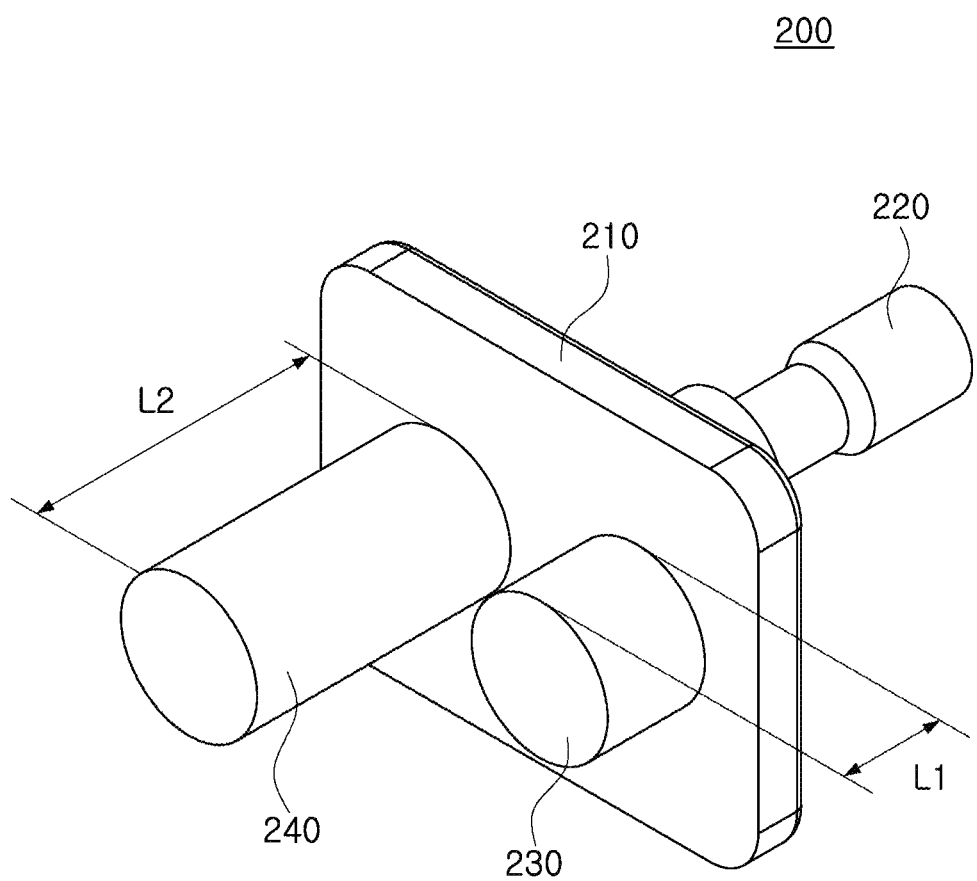
FIG. 6 is a perspective view schematically illustrating a piston part according to the present disclosure.
Figure 7:
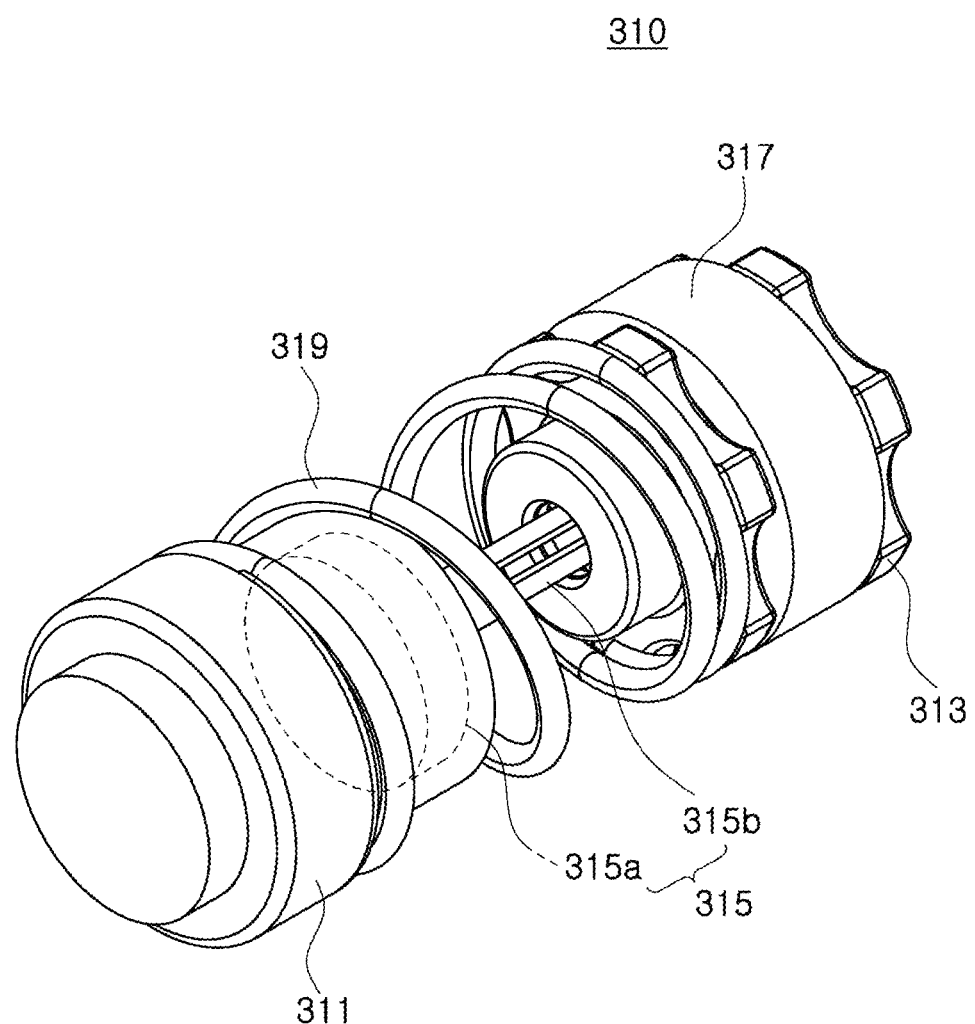
FIG. 7 is a cross-sectional view schematically illustrating the piston part according to the present disclosure.
Figure 8:
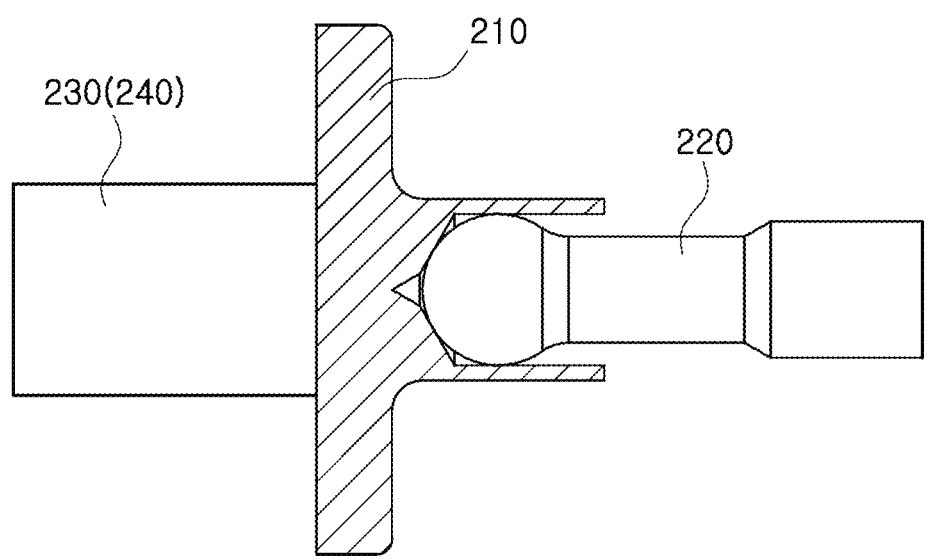
FIG. 8 is a cross-sectional view schematically illustrating that a piston pressing unit is coupled to a piston body unit in a caulking way in the piston part according to the present disclosure.
Figure 9:
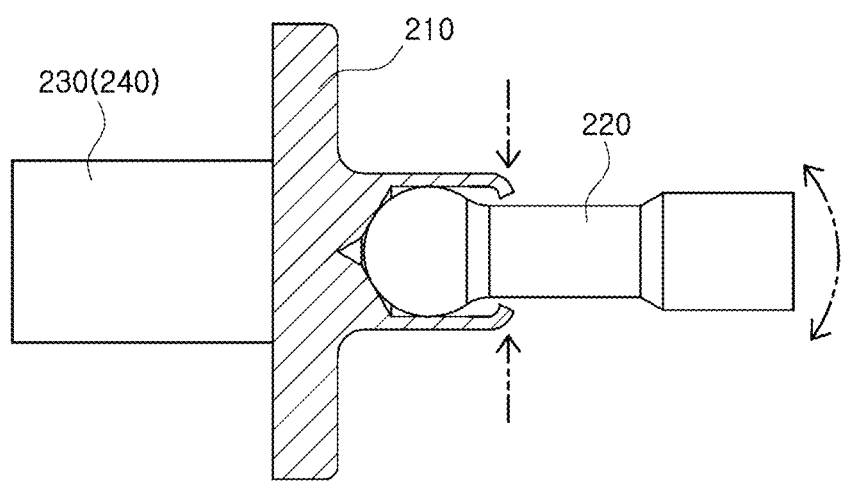
FIG. 9 is a perspective view schematically illustrating a first damper part according to the present disclosure.
Figure 10:
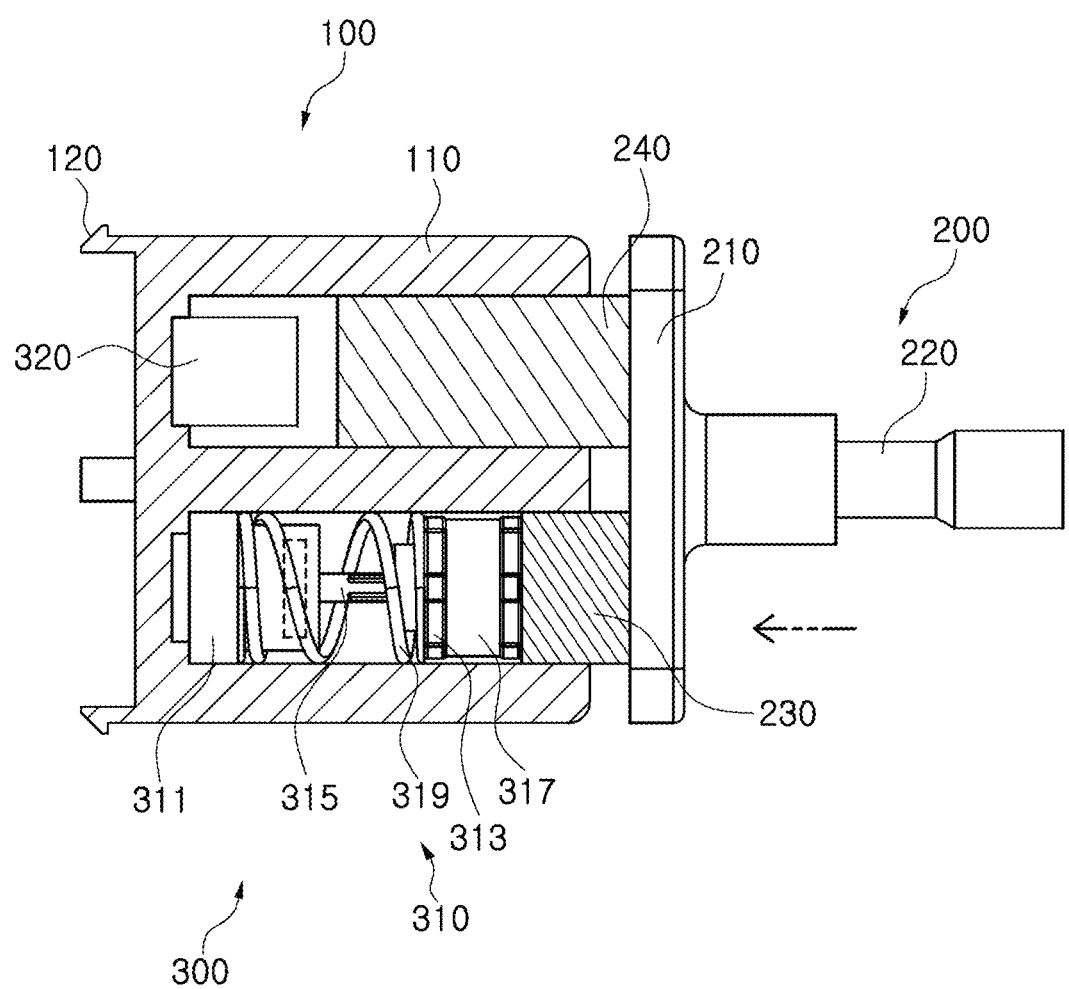
FIG. 10 is a cross-sectional view schematically illustrating initial and intermediate braking in the pedal simulator according to the present disclosure.
Figure 11:
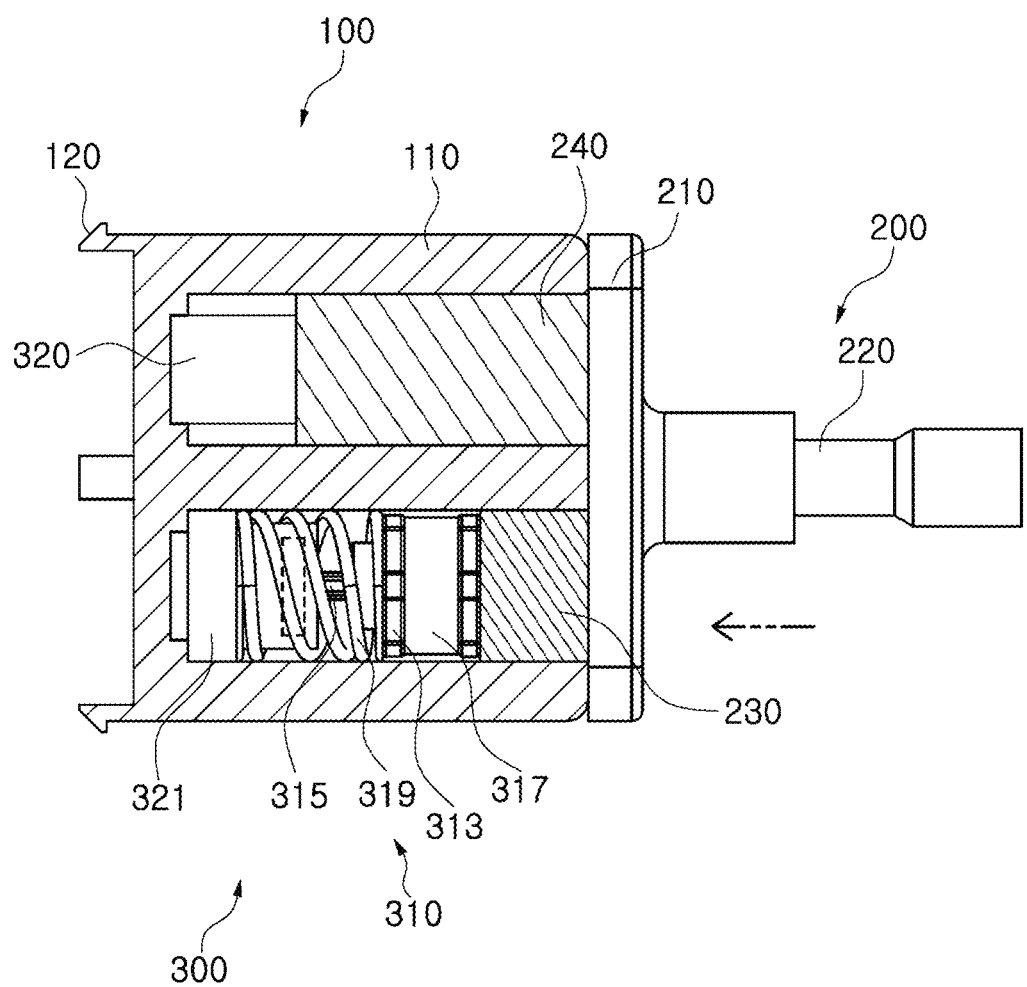
FIG. 11 is a cross-sectional view schematically illustrating later braking in the pedal simulator according to the present disclosure.

FIG. 1 is a perspective view schematically illustrating that a pedal simulator according to the present disclosure is mounted (or disposed) on an organ-type pedal part, FIG. 2 is a perspective view schematically illustrating that the pedal simulator according to the present disclosure is mounted on a pendant-type pedal part, FIG. 3 is a perspective view schematically illustrating the pedal simulator according to the present disclosure, FIG. 4 is an assembled perspective view schematically illustrating the pedal simulator according to the present disclosure, FIG. 5 is a cross-sectional view schematically illustrating the pedal simulator according to an embodiment of the present disclosure, FIG. 6 is a perspective view schematically illustrating a piston part according to the present disclosure, FIG. 7 is a cross-sectional view schematically illustrating the piston part according to the present disclosure, FIG. 8 is a cross-sectional view schematically illustrating that a piston pressing unit is coupled to a piston body unit by caulking in the piston part according to the present disclosure, FIG. 9 is a perspective view schematically illustrating a first damper part according to the present disclosure, FIG. 10 is a cross-sectional view schematically illustrating initial and intermediate braking in the pedal simulator according to the present disclosure, and FIG. 11 is a cross-sectional view schematically illustrating later braking in the pedal simulator according to the present disclosure.

Referring to FIGS. 1 and 2, a pedal simulator 1 according to the present disclosure may be detachably mounted on pedal parts 10a and 10b regardless of types and shapes of the pedal parts 10a and 10b, such as an organ-type pedal part 10a and a pendant-type pedal part 10b.

Therefore, the pedal simulator 1 according to the present disclosure is modularized and easily assembled into the pedal parts 10a and 10b such as the organ-type pedal part 10a and the pendant-type pedal part 10b. Since the pedal simulator 1 according to the present disclosure is applicable to all the pedal parts 10a and 10b, common use of the pedal simulator 1 may be achieved.

A hook part 120 of a housing 100 is hook-coupled to an insertion hole part 11a of the organ-type pedal part 10a so that the pedal simulator 1 may be easily assembled into the organ-type pedal part 10a.

In addition, the hook part 120 of the housing 100 is hook-coupled to an insertion hole part 11b of the pendant-type pedal part 10b so that the pedal simulator 1 may be easily assembled into the pendant-type pedal part 10b.

Referring to FIGS. 3 to 5, the pedal simulator 1 according to an embodiment of the present disclosure includes the housing 100, a piston part 200 and damper parts 300.

In the present embodiment, the housing 100 is mounted on the pedal parts 10a and 10b, such as the organ-type pedal part 10a and the pendant-type pedal part 10b. The damper parts 300 are mounted in an inner space of the housing 100, and the housing 100 movably accommodates the piston part 200.

The housing 100 may be detachably mounted on the pedal parts 10a and 10b, such as the organ-type pedal part 10a and the pendant-type pedal part 10b.

The housing 100 includes a housing body part 110 and the hook part 120. The damper parts 300 are mounted on one side of the housing body part 110, i.e., an inner left surface of the housing body part 110 in FIG. 5.

The piston part 200 is movably accommodated in the housing body part 110. The housing body part 110 includes a first guide unit 111 and a second guide unit 113 into which the piston part 200 can slide. The first guide unit 111 and the second guide unit 113 are formed as cylindrical grooves.

A first damper part 310 of the damper parts 300 is mounted in the first guide unit 111. A first piston rod unit 230 of the piston part 200 is slidably disposed in an inner space of the first guide unit 111. An inner diameter of the first guide unit 111 is formed to be larger than an outer diameter of the first piston rod unit 230.

A second damper part 320 of the damper parts 300 is mounted in the second guide unit 113. A second piston rod unit 240 of the piston part 200 is slidably disposed in an inner space of the second guide unit 113. An inner diameter of the second guide unit 113 is formed to be larger than an outer diameter of the second piston rod unit 240.

The hook part 120 is formed in a ring shape on an outer side of the housing body part 110, and is detachably coupled to the insertion hole parts 11a and 11b of the organ-type and pendant-type pedal parts 10a and 10b. The hook part 120 may be conveniently assembled and mounted onto the pedal parts 10a and 10b, such as the organ-type pedal part 10a and the pendant-type pedal part 10b.

The hook part 120 may be provided as a plurality of hook parts 120 which are formed at predetermined intervals on an edge of the housing body part 110. The plurality of hook parts 120 may be formed on the housing body part 110, and accordingly, insertion hole parts 11a and 11b of the pedal parts 10a and 10b may also be provided as a plurality of insertion hole parts 11a and 11b. Therefore, since the hook parts 120 and the insertion hole parts 11*a* and 11*b* of the pedal parts 10*a* and 10*b* are coupled at a plurality of points, the pedal simulator 1 and the pedal parts 10*a* and 10*b* may be stably coupled, and the rotation or movement of the pedal simulator 1 may be prevented.

Referring to FIGS. 6 to 8, the piston part 200 is slidably mounted in the inner space of the housing 100. The piston part 200 includes a piston body unit 210, a piston pressing unit 220, the first piston rod unit 230 and the second piston rod unit 240.

The piston body unit 210 is disposed on the outer side of the housing body part 110 of the housing 100. The piston body unit 210 includes a plate and a rod protruding from the plate to the opposite side of the housing body part 110.

The rod of the piston body unit 210 is formed with a hollow groove so that the piston pressing unit 220 can be mounted. That is, as illustrated in FIG. 8, the piston pressing unit 220 is mounted in the rod of the piston body unit 210, specifically, the hollow groove of the rod. The piston pressing unit 220 is moved to the left (refer to FIG. 5) by an external force.

Referring to FIGS. 8 and 9, the piston pressing unit 220 is coupled to the piston body unit 210 by caulking. That is, as the rim of the rod of the piston body unit 210 is pressed and caulked toward the piston pressing unit 220, the piston pressing unit 220 moved by the external force may be kept rotatably coupled to the rod of the piston body unit 210.

Since the piston pressing unit 220 is caulked to the piston body unit 210, assembly time and cost may be reduced.

The first piston rod unit 230 is mounted on the other side of the piston body unit 210, i.e., a left side of the piston body unit 210 in FIG. 6. The piston pressing unit 220 is mounted on one side of the piston body unit 210, and the first piston rod unit 230 and the second piston rod unit 240 are mounted on the other side of the piston body unit 210, which is opposite to one side of the piston body unit 210.

The first piston rod unit 230 presses any one of a pair of damper parts 300. That is, the first piston rod unit 230 presses the first damper part 310 of the damper parts 300.

The second piston rod unit 240 is mounted on the other side of the piston body unit 210, i.e., the left side of the piston body unit 210 in FIG. 6, so as to be spaced apart from the first piston rod unit 230, and presses the other one of the pair of damper parts 300. That is, the second piston rod unit 240 presses the second damper part 320 of the damper parts 300.

The first piston rod unit 230 and the second piston rod unit 240 are formed in a cylindrical shape and to have different lengths. The first piston rod unit 230 and the second piston rod unit 240 are spaced apart from each other and disposed in parallel on the piston body unit 210.

The first piston rod unit 230 presses the first damper part 310, and the second piston rod unit 240 presses the second damper part 320. Since the first piston rod unit 230 and the second piston rod unit 240 are formed to have different lengths, the timing at which the first piston rod unit 230 comes into contact with the first damper part 310 and the timing at which the second piston rod unit 240 comes into contact with the second damper part 320 may be different from each other.

Accordingly, since the contact time and length of the first piston rod unit 230 and the first damper part 310 are different from the contact time and length of the second piston rod unit 240 and the second damper part 320, a braking feeling felt by a user may be different, which makes it possible to provide initial and medium period braking feelings and a later period braking feeling.

A length L1 of the first piston rod unit 230 is formed to be shorter than a length L2 of the second piston rod unit 240. The first damper part 310 protrudes more toward the piston part 200 than the second damper part 320.

The first piston rod unit 230 is disposed in the housing body part 110 so as to face the first damper part 310, and is moved toward the first damper part 310 and presses the first damper part 310 when the external force is applied thereto.

The second piston rod unit 240 is disposed in the housing body part 110 so as to face the second damper part 320, and is moved toward the second damper part 320 and presses the second damper part 320 when the external force is applied thereto.

Referring to FIG. 5, before the external force is applied to the piston part 200, the second piston rod unit 240 and the second damper part 320 are spaced apart from each other, and similarly, the first piston rod unit 230 and the first damper part 310 are spaced apart from each other. A separation distance between the first piston rod unit 230 and the first damper part 310 is shorter than a separation distance between the second piston rod unit 240 and the second damper part 320.

Therefore, when the first piston rod unit 230 and the second piston rod unit 240 are moved by the movement of the piston part 200, the first piston rod unit 230 comes into contact with the first damper part 310 first. In this case, the second piston rod unit 240 is not yet in contact with the second damper part 320 (refer to FIG. 10).

Accordingly, the first piston rod unit 230 is moved to come into contact with the first damper part 310, and provides a braking operation starting force while the first piston rod unit 230 is further moved to press the first damper part 310. In this case, the first piston rod unit 230 may be provided the user with an initial period braking feeling and a medium period braking feeling.

When the movement of the piston part 200 further increases, the second piston rod unit 240 also comes into contact with the second damper part 320 (refer to FIG. 11). While the first piston rod unit 230 is already in contact with the first damper part 310, the second piston rod unit 240 comes into contact with the second damper part 320, thereby providing the user with a later period braking feeling.

The length L1 of the first piston rod unit 230 and the length L2 of the second piston rod unit 240 are tunable to provide the user with an appropriate braking feeling.

Referring to FIGS. 3 to 5 and 9, the damper part 300 is provided as a plurality of damper parts 300 that are mounted in the housing 100, and are compressed by being pressed by the piston part 200. In the present disclosure, the plurality of damper parts 300 include the first damper part 310 and the second damper part 320, and are mounted in the housing 100.

The first damper part 310 is disposed to face the first piston rod unit 230, and is mounted in the first guide unit 111 of the housing 100. In the present disclosure, the first damper part 310 is formed to protrude more toward the piston part 200 than the second damper part 320.

The first damper part 310 includes a first damper body unit 311, a first damper contact unit 313, a connection unit 315, a sensor unit 317 and a spring unit 319. The first damper body unit 311 is mounted in the first guide unit 111 of the housing body part 110. The first damper body unit 311 may be fixed to the first guide unit 111 of the housing body part 110 by bolting, bonding, press-fitting or the like.

The first damper contact unit 313 is disposed to be spaced apart from the first damper body unit 311, and comes in contact with the first piston rod unit 230 which moves. Even though the first piston rod unit 230 moves, the braking operation is not performed until the first piston rod unit 230 comes into contact with the first damper contact unit 313. Therefore, such a period that the braking operation is not performed is referred to as an invalid period of braking. A period in which the first piston rod unit 230 is moved further and comes into contact with the first damper contact unit 313 is referred to as a valid period of braking.

One side of the connection unit 315, i.e., a left side of the connection unit 315 in FIG. 4, is movably mounted in the first damper body unit 311, and the other side of the connection unit 315, i.e., a right side of the connection unit 315 in FIG. 4, is mounted on the first damper contact unit 313. The connection unit 315 includes a connection block unit 315a and a connection rod unit 315b.

The connection block unit 315a is movably mounted in the first damper body unit 311. The connection block unit 315a may be moved in an inner space of the first damper body unit 311 by the pressure from the first piston rod unit 230 transmitted through the connection rod unit 315b. The connection block unit 315a may be formed of rubber, plastic or the like.

The connection rod unit 315b is formed in a rod shape in which one side thereof, i.e., a left side thereof in FIG. 4 is mounted on the connection block unit 315a, and the other side thereof, i.e., a right side thereof FIG. 4 is mounted on the first damper contact unit 313.

The sensor unit 317 is mounted on an outer surface of the first damper contact unit 313, and measures information on a position of the first piston rod unit 230. The sensor unit 317 includes a magnet having a magnetic force. The sensor unit 317 measures information on magnitude of a stepping force applied by the first piston rod unit 230 or a position of the first piston rod unit 230 through a change in a magnetic field that is changed according to the movement of the first piston rod unit 230, and provides a control unit (not illustrated) with the measured information.

One side of the spring unit 319, i.e., a left side of the spring unit 319 in FIG. 4, is connected to the first damper body unit 311, the other side of the spring unit 319, i.e., a right side of the spring unit 319 in FIG. 4, is connected to the first damper contact unit 313, and the spring unit 319 provides an elastic force to the first damper contact unit 313 moved by the first piston rod unit 230.

The spring unit 319 is interposed between the first damper body unit 311 and the first damper contact unit 313, and is compressed by the first damper contact unit 313 pressed by the first piston rod unit 230.

When the pressing force of the first piston rod unit 230 is released, the compressed spring unit 319 provides the first damper contact unit 313 with an elastic force, i.e., an elastic restoring force, and returns the first damper contact unit 313 to its original position. The spring unit 319 may be formed of a coil spring that surrounds an outer side of the connection rod unit 315b.

The second damper part 320 is disposed to face the second piston rod unit 240, and is mounted in parallel so as to be spaced apart from the first damper part 310 in the housing 100. The second damper part 320 is mounted in the second guide unit 113 of the housing body part 110.

The second damper part 320 is formed of an elastically deformable material, and is coupled to the second guide unit 113 of the housing body part 110 of the housing 100 by press-fitting. The second damper part 320 may be coupled to the housing 100 in the press-fitting way and may be easily assembled thereto.

An operation of the pedal simulator 1 according to an embodiment of the present disclosure is described with reference to FIGS. 10 and 11.

Referring to FIG. 10, when the piston pressing unit 220 is pressed, the piston body unit 210 is moved, and accordingly, the first piston rod unit 230 and the second piston rod unit 240 are moved toward the first damper part 310 and the second damper part 320, respectively. In this case, the first piston rod unit 230 is moved along the first guide unit 111, and the second piston rod unit 240 is moved along the second guide unit 113.

The first piston rod unit 230 having a shorter separation distance from the damper parts 300 than the second piston rod unit 240 presses the first damper contact unit 313 of the first damper part 310 first. In this case, the user may have an initial period braking feeling when the first piston rod unit 230 presses the first damper contact unit 313.

When the first piston rod unit 230 continuously presses the first damper contact unit 313, the spring unit 319 is compressed and deformed so that the user may have a medium period braking feeling. While being moved by the first piston rod unit 230, the sensor unit 317 transmits information on a position or stepping force of the first piston rod unit 230 according to a change in a magnetic field to the control unit (not illustrated).

Referring to FIG. 11, when the second piston rod unit 240 disposed in parallel with the first piston rod unit 230 comes into contact with the second damper part 320, the user may have a later period braking feeling.

The second damper part 320 may be formed of an elastically deformable material including rubber, silicone or plastic, or a combination thereof. Therefore, when the second piston rod unit 240 comes into contact with the second damper part 320, the user feels harder. Accordingly, the user may recognize that the braking is completed when the second piston rod unit 240 comes into contact with the second damper part 320.

The compressed spring unit 319 provides the first damper contact unit 313 with an elastic force, i.e., an elastic restoring force, and returns the first damper contact unit 313 to its original position.

The pedal simulator 1 according to the present disclosure enables common use of products through modularization applicable to all pedal parts regardless of types and shapes of the pedal parts 10a and 10b.

Since various types of the pedal parts 10a and 10b due to modularization according to the present disclosure come into common use, repair and replacement of products can be reduced, and productivity can be improved.

In addition, according to the present disclosure, as the first piston rod unit 230 and the second piston rod unit 240 are formed to have different lengths, the first and second piston rod units are tunable so that a user can have appropriate initial and medium period braking feelings and an appropriate later period braking feeling.

Moreover, according to the present disclosure, it is possible to reduce the volume of the housing 100 through parallel structures of the first and second piston rod units 230 and 240 and the first and second damper parts 310 and 320.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined by the following claims.

What is claimed is:

1. A pedal simulator comprising:
a housing having a first surface and a plurality of guide holes inwardly extending side by side from the first surface of the housing;
a piston part including (1) a first surface facing the first surface of the housing and (2) a plurality of piston rod units extending side by side from the first surface of the piston part and configured to slidably move within the plurality of guide holes, respectively, when the piston part moves toward the housing;
a plurality of damper parts respectively disposed within the plurality of guide holes of the housing and configured to be compressed by the plurality of piston rod units, respectively, when the plurality of piston units slidably moves inwardly of the housing through the plurality of guide holes, respectively, and press the plurality of damper parts, respectively,
wherein the plurality of damper parts includes first and second damper parts, the first damper part being configured to be compressed sooner than the second damper part when the plurality of piston rod units slidably moves toward the plurality of damper parts, respectively,
wherein the piston part further includes:
a piston body unit having first and second sides; and
a piston pressing unit disposed at the first side of the piston body unit, and
the second side of the piston body has the first surface of the piston part,
wherein the plurality of piston rod units includes:
a first piston rod unit disposed at the second side of the piston body unit and configured to press the first damper part; and
a second piston rod unit disposed at the second side of the piston body unit, spaced apart from the first piston rod unit and configured to press the second damper part,
wherein the first and second piston rod units have respectively different lengths,
wherein the first damper part is disposed to face the first piston rod unit and compressed by the pressure from the first piston rod unit,
wherein the second damper part is disposed to face the second piston rod unit, spaced apart from the first damper part, and compressed by the pressure from the second piston rod unit, and
wherein the first damper part includes:
a first damper body unit disposed at the housing;
a first damper contact unit spaced apart from the first damper body unit and configured to move by the first piston rod unit in contact with the first damper contact unit;
a connection unit having a first side movably disposed on the first damper body unit and a second side disposed on the first damper contact unit;
a sensor unit disposed on the first damper body unit and configured to detect a position of the first piston rod unit; and
a spring unit having a first side in contact with the first damper body unit and a second side in contact with the first damper contact unit, and configured to provide an elastic force to the first damper contact unit.

2. The pedal simulator of claim 1, wherein the connection unit includes:
a connection block unit movably disposed at the first damper body unit; and
a connection rod unit having a first side disposed on the connection block unit and a second side disposed on the first damper contact unit.

3. The pedal simulator of claim 1, wherein the second damper part comprises an elastically deformable material and coupled to the housing.

4. The pedal simulator of claim 1, wherein the piston pressing unit is rotatably coupled to the piston body unit.

5. A pedal simulator comprising:
a housing detachably disposed on a pedal part and having a first surface and a plurality of guide holes inwardly extending side by side from the first surface of the housing;
a piston part including (1) a first surface facing the first surface of the housing and (2) a plurality of piston rod units extending side by side from the first surface of the piston part and configured to slidably move within the plurality of guide holes, respectively, when the piston part moves toward the housing;
a plurality of damper parts respectively disposed within the plurality of guide holes of the housing and configured to be compressed by the plurality of piston rod units, respectively, when the plurality of piston units slidably move inwardly of the housing through the plurality of guide holes, respectively, and press the plurality of damper parts,
wherein the plurality of damper parts includes first and second damper parts, the first damper part being configured to be compressed sooner than the second damper part when the plurality of piston rod units slidably moves toward the plurality of damper parts, respectively,
wherein the piston part further includes:
a piston body unit having first and second sides; and
a piston pressing unit disposed at the first side of the piston body unit, and
the second side of the piston body has the first surface of the piston part,
wherein the plurality of piston rod units includes:
a first piston rod unit disposed at the second side of the piston body unit and configured to press the first damper part; and
a second piston rod unit disposed at the second side of the piston body unit, spaced apart from the first piston rod unit and configured to press the second damper part, wherein the first and second piston rod units have respectively different lengths,
wherein the first damper part is disposed to face the first piston rod unit and compressed by the pressure from the first piston rod unit,
wherein the second damper part is disposed to face the second piston rod unit, spaced apart from the first damper part, and compressed by the pressure from the second piston rod unit, and
wherein the first damper part includes:
a first damper body unit disposed at the housing;
a first damper contact unit spaced apart from the first damper body unit and configured to move by the first piston rod unit in contact with the first damper contact unit;
a connection unit having a first side movably disposed on the first damper body unit and a second side disposed on the first damper contact unit;

a sensor unit disposed on the first damper body unit and configured to detect a position of the first piston rod unit; and a spring unit having a first side in contact with the first damper body unit and a second side in contact with the first damper contact unit, and configured to provide an elastic force to the first damper contact unit.

6. A pedal simulator comprising:

a housing detachably disposed on a pedal part and having an inner space;

a piston part slidably disposed at the inner space of the housing and including a plurality of piston rod units; and a plurality of damper parts disposed at the housing and facing the plurality of piston rod units, respectively, wherein each of the damper parts is compressed by a pressure from a respective one of the piston rod units, and wherein the housing includes:

a housing body part configured to movably accommodate the piston part, wherein the plurality of damper parts is disposed at the housing body part; and a hook part disposed on an outer side of the housing body part and detachably coupled to the pedal part.

7. The pedal simulator of claim 6, wherein the hook part comprises a plurality of hook parts respectively disposed at a plurality of edge portions of the housing body part.

* * * * *